Dec. 7, 1971     M. P. McCAUGHEY     3,624,926
LEARNING REINFORCER

Filed Oct. 13, 1970     2 Sheets-Sheet 1

INVENTOR
MICHAEL P. McCAUGHEY

BY *Stevens, Davis, Miller & Mosher*
ATTORNEYS

# United States Patent Office 3,624,926
Patented Dec. 7, 1971

3,624,926
LEARNING REINFORCER
Michael Paul McCaughey, Highland Park, N.J. (Dept. of Physics, Rutgers University, New Brunswick, N.J. 08903)
Filed Oct. 13, 1969, Ser. No. 865,559
Int. Cl. G09b 17/04
U.S. Cl. 35—35 B                                   5 Claims

ABSTRACT OF THE DISCLOSURE

A learning reinforcer device comprising a selectively adjustable timing device and a pair of indicating lights. The subject being tested sets the timing device for a suitable time period and presses a button at the completion of the task. The manual depression of the button will cause the energization of one of said indicating lights in accordance with the time expired on the timing device to indicate whether or not the task had been completed within the time period allowed. This device is particularly suitable for a continuing task wherein continuous time segments are monitored.

---

Figure 1:
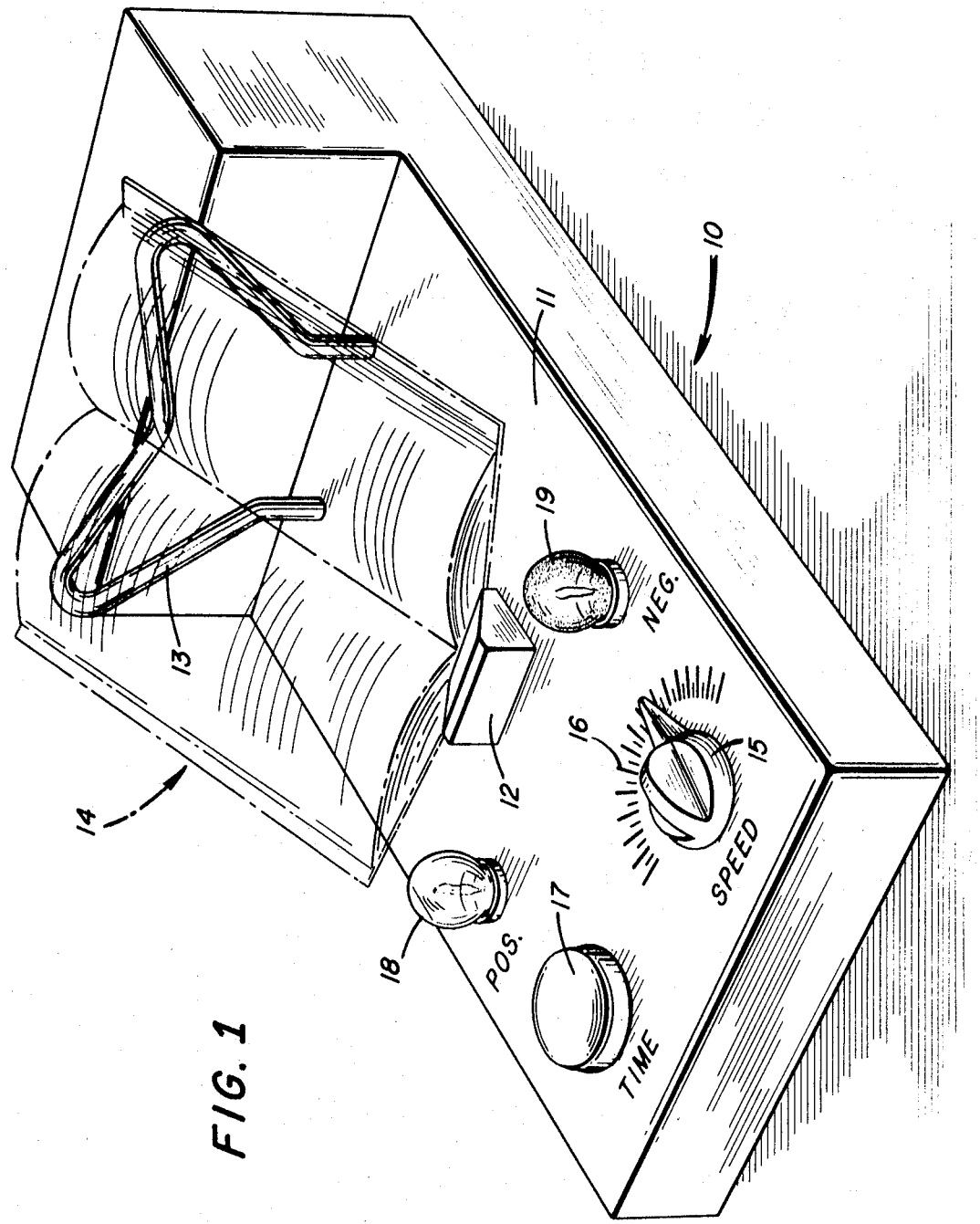

The present invention relates to learning reinforcement devices and in particular to a reading pacing device wherein the subject is attempting to read at a desired pace.

Prior art devices of this type generally have the reading matter printed on strips or rolls of paper which are continuously moved past a viewing opening. These devices are generally unsuitable since they do not allow for referring back to material which had been skipped nor for referring back to previous material for clarification. They also cannot be used with books, magazines etc. which are more readily available.

A second type of known device has a moving member, which is usually either in the form of a rod or a beam of light, which is passed over the material to be read. This type device overcomes the above-mentioned device defect in that it allows use with books, magazines, etc. However, the majority of these prior art devices have used mechanical timers of one type or another which require care and effort to accurately set the time interval and therefore are unsuitable for a continuing task.

The present invention is based on Skinnerian learning principles. Its theory has been substantiated in the reading literature by Drs. Alton Raygor and David Wark. It represents a significant departure from and an improvement over prior reading devices such as those speed reading control pacers as described in Pats. 3,302,309 and 3,311,998, both to Macomber; reading training devices such as described in Pat. 2,919,500 to Simpson et al.; the SRA spring-operated pacer; the Craig reading device; the EDL control reader; Harvard Reading Films, and various tachistoscopic devices which are commercially available.

The present invention is superior to all of the above-noted prior art devices because they are all somewhat artificial in the sense that they flash printed material on a screen for a fixed length of time which is equal to the desired constant rate of reading. On the other hand, the reading reinforcer of the present invention incorporates individual books and selections and allows variation of the reading speed in accordance with the individual needs and the type of material being used.

It is therefore an object of the present invention to provide a new and novel learning reinforcing device which may be used as a reading pacer with conventional reading materials, such as textbooks, journals and the like.

It is another object of the present invention to provide a learning reinforcer which may be used to learn to read and which is adjustable for various reading speeds and types of material being read.

It is a further object of the present invention to provide a learning reinforcer which may be readily and economically produced.

Figure 2:
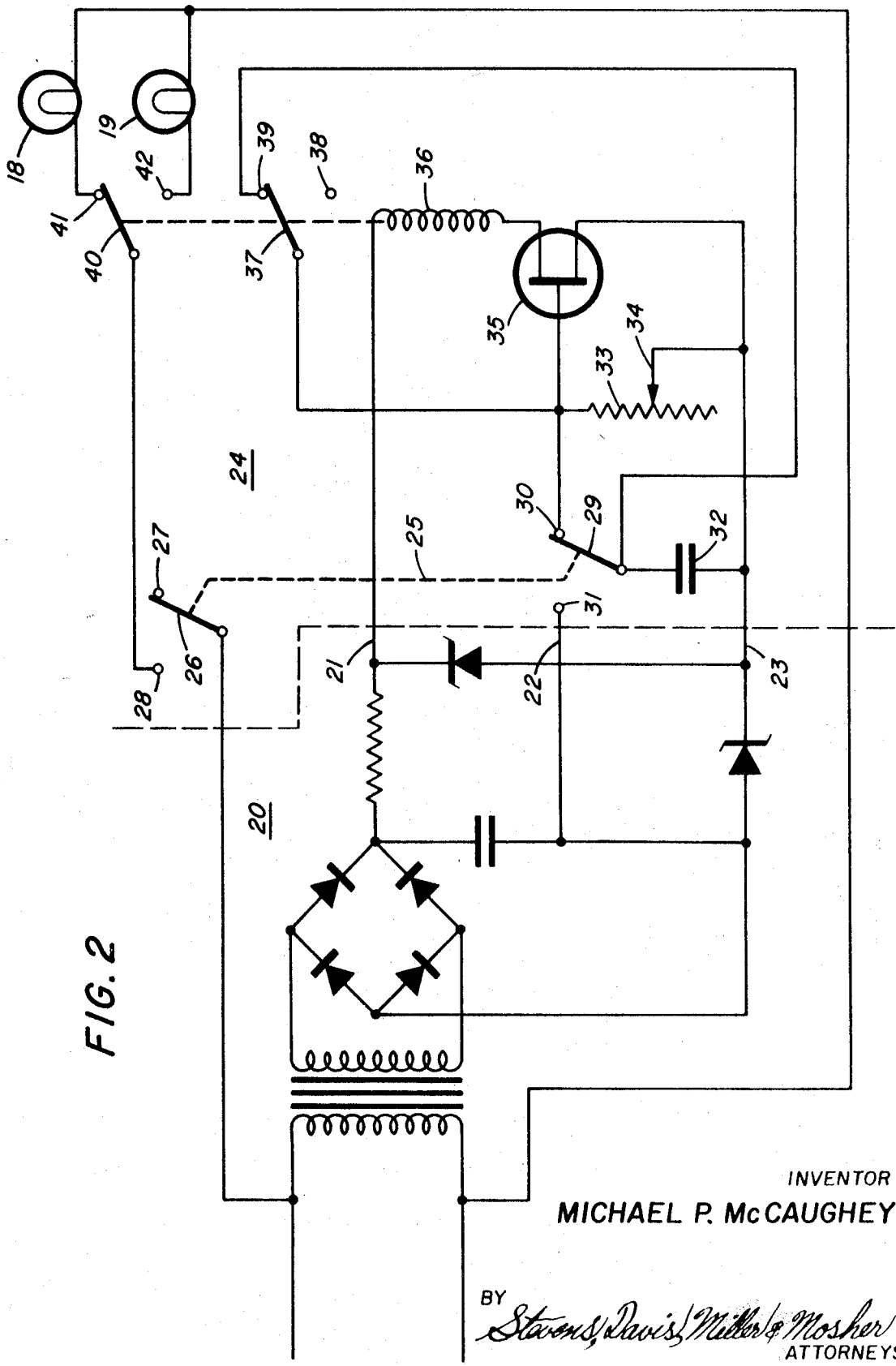

The foregoing objects, and other advantages which will be readily apparent to those skilled in the art, are set forth in the following specification and claims and are illustrated in the accompanying drawings dealing with a basic embodiment of the present invention. Reference is made now to the drawings in which:

FIG. 1 is a perspective view of the learning reinforcer embodied as a reading pacer using a conventional textbook; and FIG. 2 is an electrical schematic of the present invention.

The present invention comprises a housing 10 having a front panel 11 which includes means 12 and 13 for supporting the reading material 14, here shown in phantom as a book. The simplified controls of the invention include the speed setting or timer knob 15 and the corresponding speed scale 16, the time button 17 and the indicating lights 18 and 19, which could be suitably color coded such as white and red, respectively.

Turning now to the electrical diagram, the device is divided generally into two parts, namely the power supply portion 20 (supplying +21 volts, —3 volts and 0 volts at points 21 to 23, respectively) and the timer portion 24.

The power supply is a standard Zener controlled full wave transformer power supply and is deemed to be sufficiently clear from the drawing to obviate the need of further explanation.

The timer comprises switch 25 which is actuated by the time button 17 and is spring-biased to be normally positioned as shown with movable contacts 26 and 29 contacting terminals 27 and 30, respectively. The capacitor 32 is charged by pushing the button 17 so that contact 29 contacts terminal 31 thus supplying —3 volts to the capacitor. After the capacitor has been charged, the button 17 is released to reposition the movable contact 29 as shown so that the capacitor 32 will begin to discharge through the variable resistor 33, the wiper arm 34 of which has been set by the speed setting or timer knob 15. As the capacitor discharges, the voltage of the terminal 30 approaches zero and the field effect transistor 35 will begin to conduct to energize the relay 36 so that the movable contacts thereof, 37 and 40, will move from their rest position contacting terminals 39 and 41, respectively, to contact terminals 38 and 42, respectively.

The other half of the double pole, double throw switch 25 is used in connection with the relay contacts and comprises terminals 27 and 28 and movable contact 26. Normally, the movable contact 26 is spring-biased against terminal 27. When the time button 17 is depressed, it moves the movable contact 26 to contact terminal 28. If the time button is depressed before the transistor 35 conducts, the light 18 will be connected to 110 volts and thus will be illuminated. If the button is pushed after the relay 36 has closed, then the light 19 will be illuminated.

The relay 36 has double pole. double throw contacts of which movable contact 37 and terminals 38 and 39 serve to insure that if the button 17 is depressed before the relay 36 is closed, the movable contact 37 and terminal 39 are in contact so that the transistor voltage doses not go to zero while the capacitor is being recharged.

Alternate embodiments of the present invention could include a resistance in the wiper arm 34 of the resistor 33 to insure a minimum time on the timer. A second modification would be that the lights 18 and 19 could be replaced by any suitable electrical stimuli, such as a reward dispensing device or an audio device. Another modification could be replacement of the variable resistor with a motor-driven decade resistor which is activated whenever the light 18 goes on. This switch would alter the period of the timer with each success.

A specific example of the usage of this device is as follows: the subject would first set the speed knob 15 to a specific speed on the scale 16, for example, 150 words per minute. A book having a suitable mark every 150 words would then be placed on the supports 12 and 13 and the time button 17 depressed to charge capacitor 32 and start the timing. The subject would then commence reading and at the end of reading 150 words, when he has reached the first of the markings, he would depress the time button 17 again. One of the two indicating lights 18 and 19 would immediately be illuminated to indicate whether or not the desired reading rate of 150 words per minute was being attained. The subject could then continue to read without interruption for resetting the timer.

It is submitted that the present invenion will go a long way in eliminating the psychological problem of transfer which is often encountered when one switches from the more traditional reading devices to the printed page. This loss has been found to be as much as 50% with some persons, for example, a person who reads 500 words per minute on a reading pacer sometimes will read at a rate of only 250 words per minute when he is reading from a textbook.

The present invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced therein.

What is claimed is:

1. A learning reinforcing device for providing incentive to achieve a goal in completion of a learning exercise through positive and negative indications of achievement comprising positive and negative reinforcement means, means to enable said reinforcement means which normally enables said positive reinforcement means, timing means, means for adjustably setting said timing means for a goal time interval having a time period corresponding to the difficulty of the learning exercise, said timing means being adapted to actuate said enabling means to enable said negative indication of achievement upon completion of said time interval, and manually operated means actuatable upon the completion of the learning exercise thereby energizing said positive indication of achievement when operated before the end of said time interval and said negative indication of achievement when operated after expiration of said time interval, and resetting said timing means to the preset goal time interval.

2. A learning reinforcing device according to claim 1 wherein the learning exercise is speed reading, said device further comprising means for supporting material to be read, said timing means being calibrated in words per minute, and said reinforcement means comprising light means.

3. A learning reinforcing device according to claim 1 further comprising power supply means, said manual means comprising electrical switching means, said timing means comprising capacitor means, adjustable resistance means, relay means, and semiconductor means connected to said resistance means and to said relay means to control the latter, said switching means selectively connecting said capacitor to be charged by said power supply and to be discharged through said resistance means, whereby when the charge in said capacitor reaches a level said semiconductor will conduct, thereby energizing said relay to actuate said reinforcement means.

4. A learning reinforcing device according to claim 3 wherein said power supply means comprises a Zener controlled, full wave transformer power supply.

5. A learning reinforcing device according to claim 3 wherein said switching means comprises a spring-biased double pole, double throw switch, one of said poles normally connecting said capacitor means to said resistance means, and the other of said poles connecting said reinforcement means to said power supply when positioned against said spring biasing.

References Cited

UNITED STATES PATENTS

| | | | |
|---|---|---|---|
| 2,564,089 | 8/1951 | Williams et al. | 35—9 |
| 3,075,303 | 1/1963 | Butterly | 35—35 C |
| 3,126,648 | 3/1964 | Strong et al. | 35—35 B |

WILLIAM H. GRIEB, Primary Examiner

U.S. Cl. X.R.

324—181